US012812634B2

(12) United States Patent
Yan et al.

(10) Patent No.: US 12,812,634 B2
(45) Date of Patent: Nov. 24, 2026

(54) NTN SCHEDULING DELAY ENHANCEMENT

(71) Applicant: LENOVO (BEIJING) LIMITED, Beijing (CN)

(72) Inventors: Zhi Yan, Beijing (CN); Hongmei Liu, Beijing (CN); Yuantao Zhang, Beijing (CN); Yingying Li, Beijing (CN); Haiming Wang, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 365 days.

(21) Appl. No.: 18/549,119

(22) PCT Filed: Mar. 5, 2021

(86) PCT No.: PCT/CN2021/079323

§ 371 (c)(1),
(2) Date: Sep. 5, 2023

(87) PCT Pub. No.: WO2022/183488

PCT Pub. Date: Sep. 9, 2022

(65) Prior Publication Data

US 2025/0287372 A1 Sep. 11, 2025

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2017/0317806 | A1* | 11/2017 | Beale | H04L 27/0014 |
| 2020/0014572 | A1* | 1/2020 | Wong | H04L 1/1671 |
| 2022/0182961 | A1* | 6/2022 | Dai | H04W 56/0045 |
| 2022/0232503 | A1* | 7/2022 | Cheng | H04W 56/009 |

(Continued)

FOREIGN PATENT DOCUMENTS

| | | |
|---|---|---|
| CN | 103155634 A | 6/2013 |
| CN | 108024383 A | 5/2018 |

(Continued)

OTHER PUBLICATIONS

PCT/CN2021/079323, "Notification of Transmittal of the International Search Report and the Written Opinion of the International Searching Authority, or the Declaration", International Searching Authority, Nov. 25, 2021, pp. 1-6.

(Continued)

*Primary Examiner* — Clemence S Han
(74) *Attorney, Agent, or Firm* — Kunzler Needham & Hilton; Bruce R. Needham

(57) ABSTRACT

Methods and apparatuses for NTN scheduling delay enhancement are disclosed. A method comprises receiving a control signal, the control signal schedules an uplink data or schedules a downlink data; and transmitting the uplink data starting from a time slot that is a first time offset after the end of the control signal or transmitting a feedback data corresponding to the downlink data starting from a time slot that is a second time offset after the end of the downlink data.

19 Claims, 10 Drawing Sheets

(56) References Cited

U.S. PATENT DOCUMENTS

2023/0140371 A1* 5/2023 Dai .................... H04B 7/1851
370/329
2023/0261838 A1* 8/2023 Dai .................... H04B 7/18513

FOREIGN PATENT DOCUMENTS

WO 2018174639 A1 9/2018
WO 2021023076 A1 2/2021

OTHER PUBLICATIONS

Ericsson, "DL/UL common aspects of TDD for NB-IoT", 3GPP TSG-RAN WG1 Meeting #92bis R1-1805864, May 21-25, 2018, pp. 1-9.

* cited by examiner

NBIoT legacy

NBIoT in NTN (10 * SFN + subframe) modulo ($T_{gap}$ + $T_{UCG}$) = $T_{offset}$.

NTN SCHEDULING DELAY ENHANCEMENT

FIELD

The subject matter disclosed herein generally relates to wireless communications, and more particularly relates to methods and apparatuses for NTN scheduling delay enhancement.

BACKGROUND

The following abbreviations are herewith defined, at least some of which are referred to in the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), non-terrestrial networks (NTN), Frequency Time Division Duplex (FDD), Half duplex Frequency Time Division Duplex (HD-FDD), Physical Downlink Control Channel (PDCCH), Internet-of-Things (IoT), Narrowband Internet-of-Things (NB-IoT or NBIoT), NBIoT PDCCH (NPDCCH), Downlink control information (DCI), Physical Uplink Shared Channel (PUSCH), NBIoT PUSCH (NPUSCH), NBIoT PDSCH (NPDSCH), Hybrid Automatic Repeat reQuest (HARQ), timing advance (TA), receiver and transmitter distance (RTD), random access channel (RACH), NBIoT physical RACH (NPRACH), random access response (RAR), low earth orbit (LEO), geostationary earth orbit (GEO), uplink compensation gap (UCG), global navigation satellite system (GNSS), enhanced machine type communication (eMTC), system frame number (SFN).

For NBIoT, DCI Format N0 (referred to as DCI N0 hereinafter) is used to trigger a NPUSCH (NBIoT Physical Uplink Shared Channel) format 1 uplink transmission. When an NBIoT UE (user equipment) receives a DCI N0 on NPDCCH (NBIoT Physical Downlink Control Channel) at time slot n (hereinafter, time slot is referred to as subframe), the DCI N0 schedules the NPUSCH format 1 uplink transmission at subframe n+k.

When the maximum HARQ process number is equal to 1, the NPDCCH search space constraint is described as follows:

If the NBIoT UE detects NPDCCH with DCI Format N0 ending in subframe n or receives a NPDSCH carrying a random access response grant ending in subframe n, and if the corresponding NPUSCH format 1 uplink transmission starts from subframe n+k, the UE is not required to monitor NPDCCH in any subframe starting from subframe n+1 to subframe n+k−1. As shown in FIG. 1(*a*), the UE terminates NPDCCH monitoring from subframe n+1 to subframe n+k−1. In other words, subframe n+1 to subframe n+k−1 is NPDCCH monitoring termination period, during which the UE does not monitor NPDCCH.

When the maximum HARQ process number is equal to 2, the NPDCCH search space constraint is described as follows:

If the NBIoT UE detects NPDCCH with DCI N0 ending in subframe n, and if the corresponding NPUSCH format 1 transmission starts from subframe n+k, the UE is not required to monitor an NPDCCH candidate in two subframes starting from subframe n+k−2 to subframe n+k−1. When the maximum HARQ process number is equal to 2, the NBIoT UE has to monitor a second DCI N0 after receiving a first DCI N0. As shown in FIG. 1(*b*), if the NBIoT UE detects NPDCCH with DCI N0 (e.g. the first DCI N0) ending in subframe n, and if the corresponding NPUSCH format 1 uplink transmission starts from n+k, the UE is required to monitor an NPDCCH candidate (for the second DCI N0) in subframes starting from subframe n+1 (the next subframe of the end subframe of DCI reception) to subframe n+k−3 (three subframes before the start subframe of uplink (NPUSCH) transmission), and is not required to monitor the NPDCCH candidate in subframes starting from subframe n+k−2 to subframe n+k−1.

For NBIoT, DCI Format N1 (referred to as DCI N1 hereinafter) is used to schedule a NPDSCH downlink transmission and a corresponding HARQ feedback (NPUSCH format 2) transmission, wherein the HARQ feedback refers to whether the NPDSCH downlink transmission is successfully received. As shown in FIG. 1(*c*), DCI N1 schedules NPDSCH transmission with a scheduling delay k (i.e. NPDSCH transmission starts from subframe n+k, where DCI N1 is received in subframe n) and a corresponding HARQ feedback (NPUSCH format 2) transmission with a scheduling delay m (i.e. NPUSCH format 2 transmission starts from subframe 1+m, where NPDSCH transmission ends in subframe 1).

For NBIoT RACH procedure, after UE transmits the preamble, UE will monitor the NPDCCH for RAR. DCI Format N1 (referred to as DCI N1 hereinafter) is used to schedule RAR, and the RAR includes uplink grant for Msg3 uplink transmission. DCI N1 schedules RAR with a scheduling delay k (i.e. RAR transmission starts from subframe n+k, where DCI N1 is received in subframe n) and Msg3 transmission with a scheduling delay m (i.e. Msg3transmission starts from subframe 1+m, where RAR transmission ends in subframe 1). Msg 3 is a kind of feedback message for RAR. In the following description, Msg 3 can also be regarded as a feedback message.

In NBIoT Release 16, for NPUSCH, when a coded data is transmitted from the remote unit (e.g. UE) to the base unit (e.g. eNB), it is mapped to one or more resource units ($N_{RU}$), each of which is transmitted a number of times (i.e. repetitions) ($N_{Rep}$).

Table 1 indicates the number of resource units ($N_{RU}$) being determined by the resource assignment ($I_{RU}$) for NPUSCH. The resource assignment ($I_{RU}$) is indicated with 3 bits by the corresponding control signal (e.g., DCI format N0). The resource unit for NPUSCH is determined by the subcarrier spacing of the NPUSCH data.

TABLE 1

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 2 indicates the repetition number ($N_{Rep}$) being determined by repetition number index ($I_{Rep}$) for NPUSCH. The repetition number index ($I_{Rep}$) for NPUSCH is indicated with 3 bits by the corresponding control signal (e.g., DCI format N0).

TABLE 2

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

The subcarriers to be used for NPUSCH data transmission are different for different subcarrier spacings. For subcarrier spacing of 3.75 KHz, only single-tone $$\left(N_{sc}^{RU}=1\right)$$

is supported. For subcarrier spacing of 15 KHz, both single-tone and multiple-tone are supported. One or three or six or twelve of twelve subcarriers $$\left(N_{sc}^{RU}=1 \text{ or } 3 \text{ or } 6 \text{ or } 12\right)$$

is used within one NBIoT carrier.

In scenario of converge enhancement for NBIoT, a total duration of a NPUSCH transmission may span tens of seconds. Table 3 indicates the maximum total durations of NPUSCH transmissions. It can be seen that a NPUSCH transmission can span up to 40960 ms (approximately 40 s).

TABLE 3

| NPUSCH format | Δf | $N_{SE}^{RU}$ | $N_{slots}^{UL}$ | Total Duration $N_{Rep}$ = 128, $N_{RU}$ = 10(format1) |
|---|---|---|---|---|
| 1 | 3.75 kHz | 1 | 16 | 2 * 16 * 10 * 128 = 40960 ms |
| | 15 kHz | 1 | 16 | 0.5 * 16 * 10 * 128 = 10240 mg |
| | | 3 | 8 | 0.5 * 8 * 10 * 128 = 5120 ms |
| | | 6 | 4 | 0.5 * 4 * 10 * 128 = 2560 ms |
| | | 12 | 2 | 0.5 * 2 * 10 * 128 = 1280 ms |
| 2 | 3.75 kHz | 1 | 4 | 2 * 4 * 128 = 1024 ms |
| | 15 kHz | 1 | 4 | 0.5 * 4 * 128 = 256 ms |

The long receiver and transmitter distance (RTD) in NTN has an impact on timing relationship of NR (New Radio). An additional delay offset $K_{offset}$ can be introduced to modify relevant timing relationships.

For example, as shown in FIG. 2(*a*), for the transmission timing of DCI scheduled NPUSCH in NBIoT legacy, the UE transmits the NPUSCH from subframe n+$k_0$ (i.e. k=$k_0$). The scheduling delay ($k_0$) between the end subframe of the DCI N0 and the start subframe of the corresponding NPUSCH (i.e. NPUSCH format 1) is indicated by DCI N0. In particular, the scheduling delay ($k_0$) depends on the scheduling delay index ($I_{Delay}$) contained in the DCI N0, as shown in Table 4.

TABLE 4

| $I_{Delay}$ | $k_0$ |
|---|---|
| 0 | 8 |
| 1 | 16 |
| 2 | 32 |
| 3 | 64 |

On the other hand, as shown in FIG. 2(*b*), for the transmission timing of DCI scheduled NPUSCH in NBIoT in NTN, the UE may transmit the NPUSCH from subframe n+$k_0$+$K_{offset}$ (i.e. k=$k_0$+$K_{offset}$). $k_0$ is determined (or indicated) by the scheduling delay index ($I_{Delay}$) contained in DCI N0. An additional delay offset $K_{offset}$ is related to the round trip distance from the UE and eNB. The additional delay offset $K_{offset}$ can be configured in SIB or RRC signaling. If the UE has its location information and the earth orbit and ephemeris information, the UE can calculate the round trip delay between the eNB and the UE by itself. The earth orbit and ephemeris information indicate the position where the satellite is. In other words, the additional delay offset $K_{offset}$ can be alternatively determined by the UE itself. The value of the additional delay offset $K_{offset}$ may be determined by types of satellites. For example, if the eNB is on LEO, $K_{offset}$ can be tens of milliseconds, while if the eNB is on GEO, $K_{offset}$ can be hundreds of milliseconds.

As can be seen from Table 3, NPUSCH transmissions may span long time duration due to a large number of repetitions as well as due to time expansion in single subcarrier with 3.75 kHz subcarrier spacing. In HD-FDD NBIoT, it is hard to maintain 0.1 ppm of frequency synchronization accuracy during long uplink transmission (e.g. with large number of repetitions). Uplink transmission gaps for long uplink (e.g. NPUSCH or NPRACH) transmissions are introduced. During the uplink transmission gaps, the UE may switch to DL and perform time and/or frequency synchronization.

An uplink transmission with gap is defined by an uplink compensation gap (UCG timer) and a transmission gap, as shown in FIG. 3. The UCG timer has a period $T_{UCG}$, and the transmission gap has a length $T_{gap}$. Each uplink transmission of duration greater than or equal to $T_{UCG}$ is inserted with the transmission gap after each $T_{UCG}$ transmission until the uplink transmission completes. That is, the uplink data transmission is inserted with transmission gap(s), the transmission gap is defined by the UCG timer ($T_{UCG}$) and the length ($T_{gap}$) of the transmission gap. After uplink transmission of each period $T_{UCG}$, one transmission gap with a length $T_{gap}$, during which the UE may switch to DL and perform time and/or frequency synchronization, is followed. The length of the uplink compensation gap (UCG timer) $T_{UCG}$ and the length ($T_{gap}$) of the transmission gap can be in unit of millisecond (i.e. ms). For NPUSCH, UCG timer $T_{UCG}$=256 ms, and $T_{gap}$=40 ms. For NPRACH, UCG timer $T_{UCG}$=64*(preamble duration), and $T_{gap}$=40 ms.

If the UE is configured with 2 HARQ process numbers, there is a restriction on scheduling to avoid misunderstanding of the position of the transmission gap.

If the UCG timer $T_{UCG}$ is configured as 256 ms, a normal uplink transmission (two NPUSCH transmissions are scheduled by two DCIs N0) is shown in FIG. 4(*a*). A first DCI N0 (DCI 0) schedules NPUSCH transmission 0, while a second DCI N0 (DCI 1) schedules NPUSCH transmission 1. For simplicity, it is supposed that both DCI 0 and DCI 1 are transmitted in the same time slot (e.g. subframe n). As shown in FIG. 1(*b*), DCI 1 may alternatively be transmitted in any of subframes n+1 to n+k−3. For NPUSCH transmission 0 scheduled by DCI 0, the scheduling delay is 8 ms, while the length of the NPUSCH transmission 0 is 56 ms. For NPUSCH transmission 1 scheduled by DCI 1, the scheduling delay is 64 ms, while the length of the NPUSCH transmission 1 is 256 ms. When the UCG timer is configured as 256 ms, there would be a transmission gap (labeled as "GAP" in FIG. 4(*a*)) with a length $T_{gap}$ after 256 ms of transmission time (includes 56 ms of NPUSCH transmission 0 and first 200 ms of NPUSCH transmission 1). The remaining 56 ms of NPUSCH transmission 1 will be transmitted after the transmission gap.

However, misunderstanding of the position of the transmission gap may happen when the first DCI N0 (i.e. DCI 0) is missing (e.g. not correctly received by the UE).

Suppose that DCI 0 schedules NPUSCH transmission 0 with a scheduling delay of 8 ms and a length of 56 ms, while DCI 1 schedules NPUSCH transmission 1 with a scheduling delay of 64 ms and a length of 256 ms. In addition, the UCG timer $T_{UCG}$ is configured as 256 ms.

As shown in FIG. 4(*b*), if DCI 0 is missing (not correctly received by the UE) while DCI 1 is correctly received by the UE, the UE would consider that the start of the UCG timer is the start of the NPUSCH transmission 1. As only 256 ms transmission (including transmission of NPUSCH transmission 1) is scheduled, the UE would consider that there is no transmission gap. In other words, if a transmission gap exists, it is positioned after the NPUSCH transmission 1 of 256 ms.

On the other hand, as shown in FIG. 4(*c*), since the eNB does not know that DCI 0 is missing (not correctly received by the UE) (i.e. the eNB considers that the DCI 0 is correctly received by the UE), the eNB would consider that the start of the UCG timer is the start of NPUSCH transmission 0. In this condition, the eNB would consider that a transmission gap with a length $T_{gap}$ would be positioned 256 ms after the start of the NPUSCH transmission 0 (i.e. a 40 ms ($T_{gap}$) transmission gap would be 200 ms after the start of the NPUSCH transmission 1), and the last 56 ms of the NPUSCH transmission 1 would be transmitted after the 40 ms transmission gap.

A comparison of FIG. 4(*b*) and FIG. 4(*c*) indicates that the eNB and the UE have a misunderstanding on the position of the transmission gap (labeled as "GAP" in FIG. 4(*c*)).

To avoid such misunderstanding, it is agreed that the UE does not expect to receive a second DCI Format N0 (i.e. DCI 1) before subframe n+k−2 for which the corresponding NPUSCH format 1 transmission scheduled by DCI 1 ends later than subframe n+k+255 (suppose $T_{UCG}$=255+1), where k=8 ms in FIGS. 4(*a*), 4(*b*) and 4(*c*). According to this agreement, the total length of NPUSCH transmission 0 and NPUSCH transmission 1 would not be larger than 256 ms (i.e. UCG timer). Accordingly, no transmission gap would be necessary, which would guarantee no misunderstanding of the position of the transmission gap.

For NTN network, the satellite (e.g., LEO) is moving with high speed, the propagation delay and frequency between the satellite and UE are always changing.

Suppose that the satellite orbital speed is 7.5 km/s at 600 km altitude and that a minimum elevation angle on earth is approximately 10 degrees, the maximum delay drift between the satellite and UE will be on the order of ±20 μs/s.

For one PUSCH transmission spamming up to 40 s, the delta propagation delay is changed up to 0.8 ms (based on a delay drift of ±20 μs/s) from the beginning to the end of PUSCH transmission. If TA is not updated in a PUSCH transmission (for example, spanning up to 40 s), the TA adopted in the beginning is not suitable in the middle (and at the end) of the PUSCH transmission, because if the delta TA exceeds $\pm T_0$ (e.g., half of OFDM Cyclic Prefix (i.e. CP/2) will destroy OFDM orthogonality.

GNSS (global navigation satellite system) module and NBIoT/eMTC module are used for TA estimation and compensation, and frequency (e.g. Doppler shift) estimation and compensation. The uplink transmission gap design described above can be reused. In particular, a transmission gap with length of $T_{gap}$ is inserted after every $T_{UCG}$ duration from the beginning of the uplink transmission. In these transmission gaps, the UE may switch to GNSS module and/or NBIoT/eMTC module for TA estimation and adjustment, and/or Doppler shift estimation and compensation. When CP=5 μs (±2.5 μs), TA should be updated less than every 250 ms (±125 ms). In consideration of initial TA error margin, $T_{UCG}$ can be configured to be shorter than legacy 256 ms, e.g. to 100 or 64 or 32 ms; while $T_{gap}$ should be configured as 40 ms. For preamble transmission, $T_{UCG}$should be multiple of preamble transmission duration (5.6 or 6.4 ms). For example, TA should be updated every $T_{UCG}$=16*5.6 or 16*6.4 ms, $T_{gap}$ should be 40 ms.

FIG. 5 illustrates an example in which the UCG timer is 64 ms and the length of transmission gap (labeled as "GAP") is 40 ms.

It can be seen that, for NTN IoT (e.g., NBIoT or eMTC), the UCG timer $T_{UCG}$ may be shorter than that of in legacy NBIoT; and length ($T_{gap}$) of the transmission gap (e.g. GAP in FIG. 5) may be longer than or the same as that of in legacy NBIoT, in consideration of potential switch to GNSS module and/or NBIoT module for TA and Doppler shift estimation and compensation. The UCG timer may be configured by higher layer, and is related to TA drift due to satellite moving.

Due to moving of the satellite for NTN IoT, shorter transmission gap period (shorter UCG timer $T_{UCG}$) and longer gap length (longer $T_{gap}$) are proposed to compensate the timing offset (TO) that is shorter than required timing (e.g., $\Delta t<CP$).

If the legacy rules are followed (to avoid misunderstanding of the position of the transmission gap), there is a similar scheduling restriction that the UE does not expect to receive a DCI format N0 before subframe n+k−2 for which the corresponding NPUSCH format 1 transmission ends later than subframe $n+k+T_{UCG}-1$. The scheduling of uplink transmission is constricted. For example, if $T_{UCG}$=64 ms while the first scheduled NPUSCH transmission is 56 ms, the length of the second scheduled NPUSCH transmission has to be shorter than 8 ms.

This disclosure targets for NTN scheduling delay enhancement to eliminate the restriction of the scheduling of uplink transmission.

BRIEF SUMMARY

Methods and apparatuses for NTN scheduling delay enhancement are disclosed.

In one embodiment, a method comprises receiving a control signal, the control signal schedules an uplink data or schedules a downlink data; and transmitting the uplink data starting from a time slot that is a first time offset after the end of the control signal or transmitting a feedback data corresponding to the downlink data starting from a time slot that is a second time offset after the end of the downlink data. In the method, the uplink data or the feedback data may be inserted with transmission gap(s), the transmission gap is defined by an uplink compensation gap duration ($T_{UCG}$) and a length ($T_{gap}$) of the transmission gap.

In one embodiment, a first transmission gap starts from a gap time offset ($T_{offset}$) after the start of the uplink data or the feedback data. The gap time offset ($T_{offset}$) may be indicated in the control signal. In addition, the gap time offset ($T_{offset}$) may be in unit of the uplink compensation gap duration ($T_{UCG}$).

In another embodiment, a start time slot of each transmission gap may meet a condition determined by the uplink compensation gap duration ($T_{UCG}$), the length ($T_{gap}$) of the transmission gap, and a gap time offset ($T_{offset}$). For example, the condition may be: (10*SFN+subframe) modulo $(T_{gap}+T_{UCG})=T_{offset}$, where SFN (system frame number) and subframe are start SFN and start subframe of uplink data or feedback data transmission. The gap time offset ($T_{offset}$) may be configured by higher layer. The first time offset or the second time offset may exclude the length of the transmission gap. The uplink data or the feedback data is postponed to be transmitted from a time slot meeting the condition.

In some embodiment, the first time offset or the second time offset may include a first number of the transmission gaps, wherein the first number is indicated in the control signal. In some other embodiment, the first time offset or the second time offset may be determined by at least one of a first scaling factor (α), a first time duration (T) and a second time duration (β). The first time duration (T) may be configured by higher layer or determined by at least one of a resource unit number ($N_{RU}$), a repetition number ($N_{Rep}$) and a slot time duration ($N_{slot}$) of the uplink data or the feedback data. The first scaling factor (α) and/or the second time duration (β) may be indicated in the control signal.

In another embodiment, a remote unit comprises a receiver that receives a control signal, the control signal schedules an uplink data or schedules a downlink data; and a transmitter that transmits the uplink data starting from a time slot that is a first time offset after the end of the control signal or transmits a feedback data corresponding to the downlink data starting from a time slot that is a second time offset after the end of the downlink data.

In one embodiment, a method comprises transmitting a control signal, the control signal schedules an uplink data or schedules a downlink data; and receiving the uplink data starting from a time slot that is a first time offset after the end of the control signal or receiving a feedback data corresponding to the downlink data starting from a time slot that is a second time offset after the end of the downlink data.

In yet another embodiment, a base unit comprises a transmitter that transmits a control signal, the control signal schedules an uplink data or schedules a downlink data; and a receiver that receives the uplink data starting from a time slot that is a first time offset after the end of the control signal or receives a feedback data corresponding to the downlink data starting from a time slot that is a second time offset after the end of the downlink data.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 1(*b*) illustrates a legacy DCI N0 scheduling NPUSCH transmission when maximum HARQ process number is equal to 2;

FIG. 1(*c*) illustrates a legacy DCI N1 scheduling NPDSCH transmission and its corresponding feedback;

FIG. 2(*b*) illustrates an updated legacy scheduling delay in NBIoT in NTN;

FIG. 4(*b*) illustrates UE's understanding when a first DCI is missed by the UE;

FIG. 4(*c*) illustrates eNB's understanding when the eNB does not know that a first DCI is missed by the UE;

FIG. 6(*b*) illustrates an example of the first embodiment;

FIG. 7(*b*) illustrates another example of the second embodiment;

DETAILED DESCRIPTION

Figure 1A:
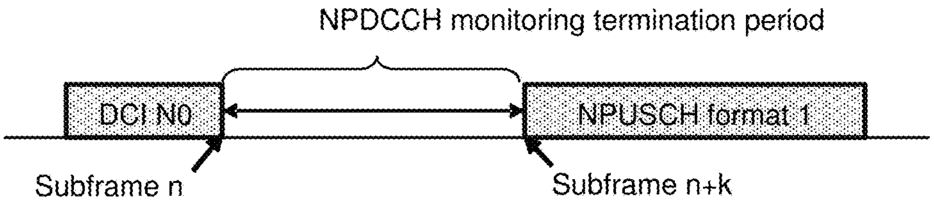
FIG. 1(a) Prior Art
FIG. 1(*a*) illustrates a legacy DCI N0 scheduling NPUSCH transmission when maximum HARQ process number is equal to 1.
Figure 1B:
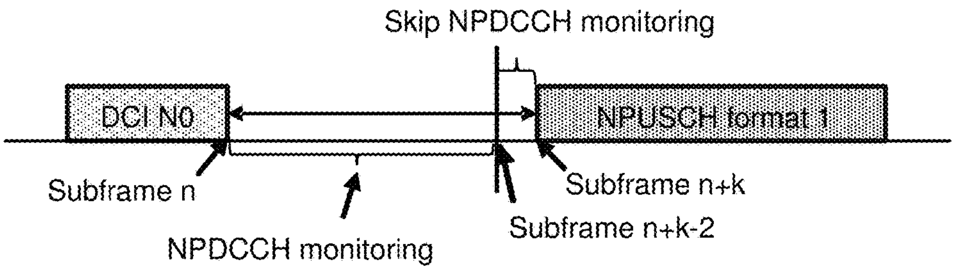
FIG. 1(b) Prior Art
Figure 1C:
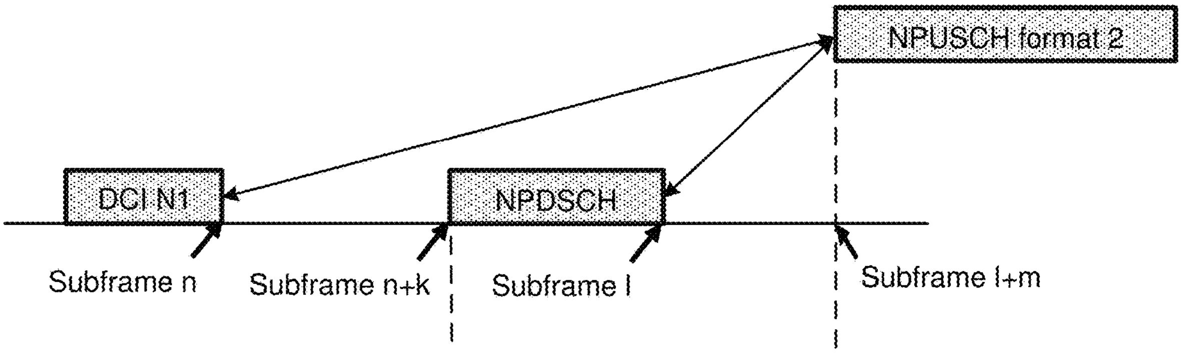
FIG. 1(c) Prior Art

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

Figure 6A:
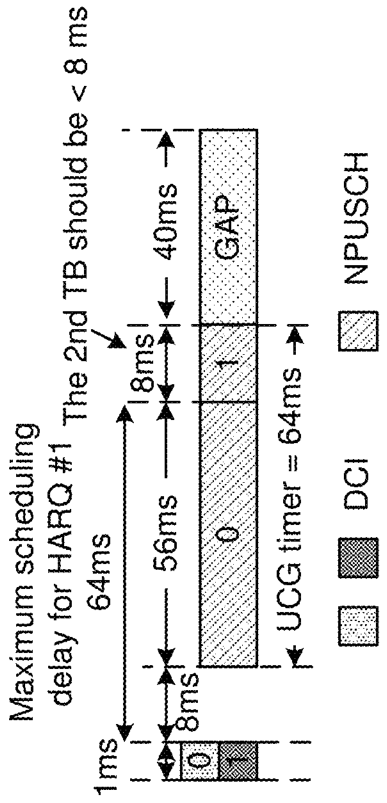
FIG. 6(*a*) illustrates when the UCG timer is 64 ms that the scheduled NPUSCH transmission 1 shall be no more than 8 ms to avoid misunderstanding of the position of the transmission gap.
Figure 6B:
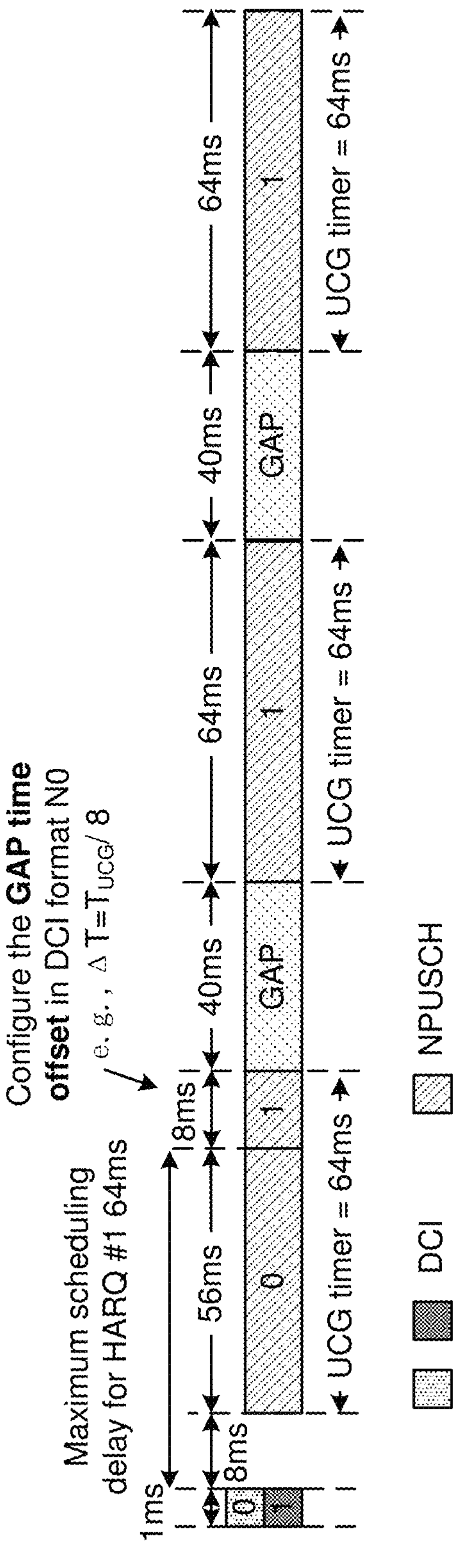

As described in the background part, when a transmission gap is necessary to be introduced in the uplink (e.g. NPUSCH) transmission, misunderstanding of the position of the transmission gap may happen, e.g., when a first DCI N0 is missing (not correctly received by the UE). As shown in FIG. 6(*a*), when the maximum scheduling delay for HARQ #1 (i.e. for scheduled NPUSCH transmission 1) is 64 ms, if the UCG timer is set to 64 ms, the scheduled NPUSCH transmission 1 shall be no more than 8 ms to avoid misunderstanding of the position of the transmission gap (suppose that the length of NPUSCH transmission 0 is 56 ms).

This disclosure proposes to indicate the start of the first transmission gap to the UE, to avoid misunderstanding of the position of the transmission gap and at the same time without limiting the length the scheduled NPUSCH transmission.

According to a first embodiment, a gap time offset ($T_{offset}$) from the start of each uplink transmission is indicated in scheduling DCI. The gap time offset indicates the length from the start of the scheduled uplink transmission to the start of the first transmission gap. The gap time offset ($T_{offset}$) can be in unit of UCG timer ($T_{UCG}$).

For example, in FIG. 6(*b*), the GAP time offset ($T_{offset}$) for the scheduled NPUSCH transmission 1 is set to ⅛, that is, the GAP time offset ($T_{offset}$) for the scheduled NPUSCH transmission 1 is equal to $T_{UCG}/8$ (i.e. 64 ms/8=8 ms). As a result, the first transmission gap is positioned 8 ms (GAP time offset) after the start of the scheduled NPUSCH transmission 1. The following (the second, the third, . . . etc) transmission gaps will be determined according to the UCG timer ($T_{UCG}$). For example, after the first transmission gap, the NPUSCH transmission 1 will continue for a period of UCG timer (64 ms). Afterwards, a second transmission gap follows. The same repeats until the scheduled uplink transmission completes.

Incidentally, the GAP time offset ($T_{offset}$) for the scheduled NPUSCH transmission 0 is set to 0, which means no gap is necessary for the NPUSCH transmission 0.

The gap time offset can be indicated from a gap time offset set. For example, if 2 bits in DCI are used to indicate the gap time offset, the gap time offset set may be {⅛, ¼, ½, 1 (or 0)}. For another example, if 1 bit in DCI is used to indicate the gap time offset, the gap time offset set may be {½, 1 (or 0)}.

As a whole, for each NPUSCH transmission (with transmission gap and UCO timer $T_{UCG}$) greater than or equal to $T_{offset}$, a first transmission gap with a length of $T_{gap}$ applies after the $T_{offset}$, while the following (the second, the third, etc) transmission gaps each with a length of $T_{gap}$ applies after every UCG timer $T_{UCG}$ until the uplink transmission completes.

If $T_{offset}$=1 or 0, it is assumed that there is transmission gap with a length of $T_{gap}$ (e.g., 40 ms) before the NPUSCH transmission.

Alternatively, if $T_{offset}$=1, it is assumed that there is transmission gap with a length of $T_{gap}$ (e.g., 40 ms) before the NPUSCH transmission; while if $T_{offset}$=0, it is assumed that there is no transmission gap with a length of $T_{gap}$ (e.g., 40 ms) before the NPUSCH transmission.

In the first embodiment, the gap time offset ($T_{offset}$) for an NPUSCH transmission is contained in the DCI scheduling the NPUSCH transmission. So, the gap time offset ($T_{offset}$) can be dynamically determined for each NPUSCH transmission.

A variety of the first embodiment is described with reference to DCI N1 scheduling NPDSCH transmission and its corresponding feedback message (HARQ ACK/NACK message to the NPDSCH transmission) via NPUSCH DCI format 2. The feedback message starts from m time slots (e.g. m subframes) after the end of NPDSCH transmission.

A transmission gap with a length of $T_{gap}$ (e.g., 40 ms) is also to be introduced in the uplink transmission of the feedback message. Similar to the scenario of DCI format N0 scheduling a NPUSCH transmission, in the uplink transmission of the feedback message, the feedback message is inserted with transmission gap(s). The uplink transmission of the feedback message with transmission gap(s) is defined by an uplink compensation gap (UCG timer) having a period $T_{UCG}$, and the length ($T_{gap}$) of the transmission gap. According to the variety of the first embodiment, a gap time offset ($T_{offset}$) from the start of the feedback message can be also indicated in scheduling DCI N1. The gap time offset indicates the length from the start of feedback message to the start of a first transmission gap. Incidentally, for the Msg3 transmission scheduled by RAR, a gap time offset ($T_{offset}$) from the start of the Msg3 transmission can be also indicated in the RAR, where the gap time offset indicates the length of time from the start of Msg3 to the start of a first transmission gap.

Figure 7A:
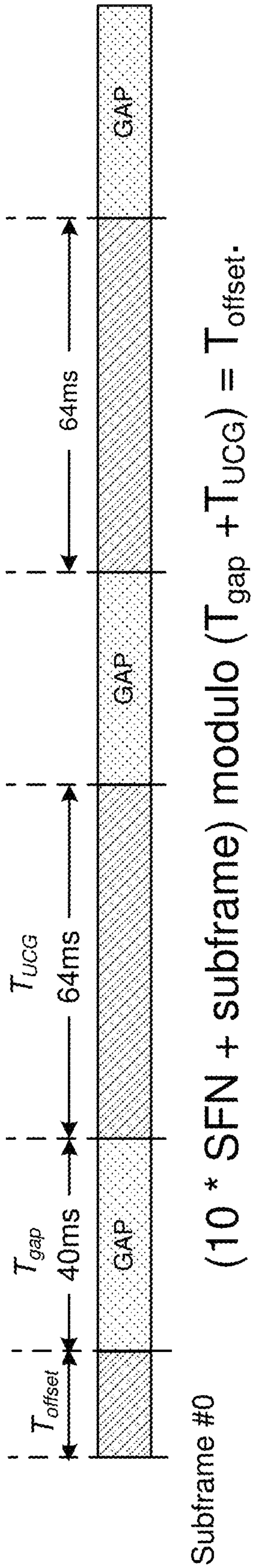
FIG. 7(*a*) illustrates an example of the second embodiment.
Figure 7B:
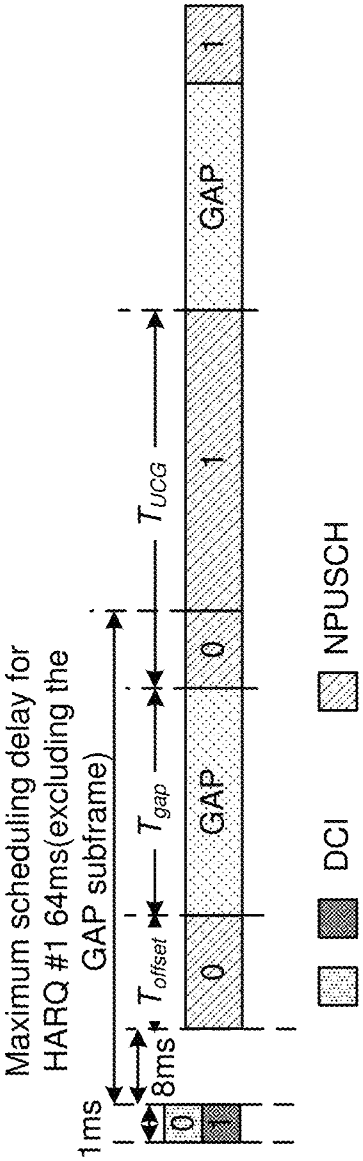

According to a second embodiment, the gap time offset ($T_{offset}$) is semi-statically configured with higher layer parameter For example, for each NPUSCH transmission (with transmission gap and UCO timer $T_{UCG}$) (e.g., NPUSCH format 1 transmission scheduled by DCI format N0, NPUSCH format 2 HARQ feedback transmission scheduled by DCI format N0, and Msg3 transmission scheduled by RAR), the start SFN (system frame number) and start subframe of each NPUSCH transmission meet the condition: (10*SFN+subframe) modulo ($T_{gap}$+$T_{UCG}$)=$T_{offset}$, as shown in FIG. 7(*a*). The length ($T_{gap}$) of the transmission gap, the UCG timer ($T_{UCG}$), and the gap time offset ($T_{offset}$) can be configured by higher layer parameter.

As the start of each NPUSCH transmission has to meet the condition, the UE will postpone the NPUSCH transmission to the available uplink subframe meeting the condition.

In addition, because the (first) transmission gap is predetermined by the condition (i.e. known to both the eNB and the UE), it is reasonable that the scheduling delay does not consider the transmission gap. For example, as shown in FIG. 7(*b*), suppose k=8 ms and the length of the scheduled NPUSCH transmission 0 is 56 ms, the scheduling delay of NPUSCH transmission 1 is still 64 ms (=8+56), although there is a transmission gap (labeled as “GAP” in FIG. 7(*b*)) during the transmission of NPUSCH transmission 0 (that is, the actual scheduling delay of NPUSCH transmission 1 is 64+$T_{gap}$)

There are two separate modules: one is a GNSS module and the other is an NBIoT/eMTC module. The GNSS module is used for calculating and measuring the position of the UE while the NBIoT/eMTC module is used for wireless radio link communication. For the uplink transmission via NBIoT/eMTC module, the TA is calculated based on the position of the UE and the satellite ephemeris from the GNSS module. Before the uplink transmission, the UE will switch to GNSS module for measuring UE position, and updating the TA information. If the GNSS module and the NBIoT/eMTC module can't work simultaneously, the radio link communication will be interrupted. The interrupted period can be assumed to be a transmission gap. It is preferable that the UE will, for each uplink transmission, reserve some time (e.g., gap) to calculate its position based on GNSS module and estimate and/or compensate the TA and Doppler shift.

Figure 8:
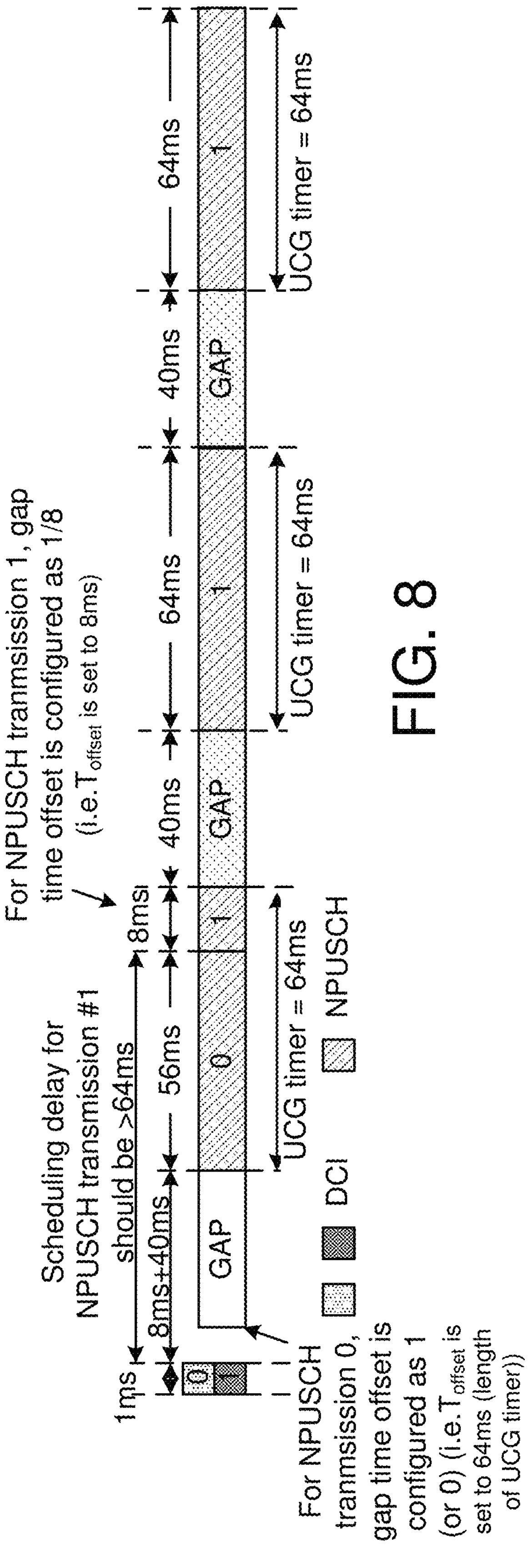
FIG. 8 illustrates for NPUSCH transmission 1, the gap time offset is configured to ⅛.

As can be seen from FIG. 8, for scheduled NPUSCH transmission 0, the gap time offset is configured as 1 (or 0). A gap (for example 40 ms), that is used for uplink TA update and/or frequency synchronization, is inserted before the scheduled NPUSCH transmission 0. So, the scheduling delay for NPUSCH transmission 1 will be larger than 64 ms. For NPUSCH transmission 1, the gap time offset may be configured as 1/8 (i.e. $T_{offset}$ is equal to $T_{UCG}$/8 (e.g. 64 ms/8=8 ms)), where the UCG timer $T_{UCG}$ is set to 64 ms. So, the scheduling delay of NPUSCH transmission 1 is increased due to the transmission gap (e.g. with a length of 40 ms) before the scheduled NPUSCH transmission 0. In the example of FIG. 8, the scheduling delay of NPUSCH transmission 1 is increased by a time length of the gap (40 ms), i.e. from 64 ms (=8 (scheduling delay of NPUSCH transmission 0)+56 (time length of NPUSCH transmission 0)) to 104 ms (=8 (scheduling delay of NPUSCH transmission 0)+40 (time length of the gap)+56 (time length of NPUSCH transmission 0).

As a whole, due to 1) potential longer transmission gap, and 2) potential longer uplink transmission duration due to the gap duration for GNSS module and NBIoT/eMTC module, the scheduling delay for uplink transmission of 64 ms is not enough.

Figure 2A:
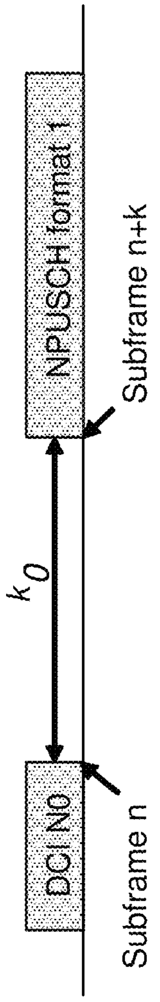
FIG. 2(a) Prior Art
FIG. 2(*a*) illustrates a legacy scheduling delay in NBIoT.
Figure 2B:
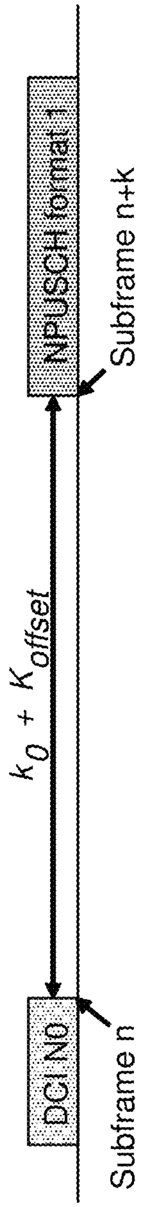
FIG. 2(b) Prior Art
Figure 3:
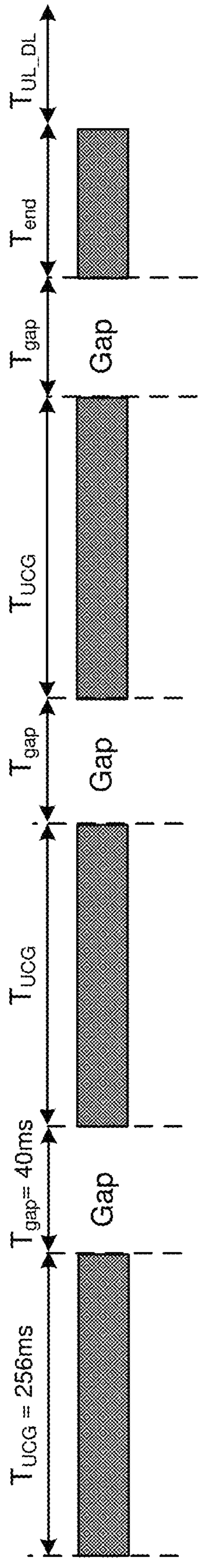
FIG. 3 Prior Art
FIG. 3 illustrates a legacy uplink transmission gap defined by a UCG timer and a length of the transmission gap.
Figures 4A, 4B, 4C:
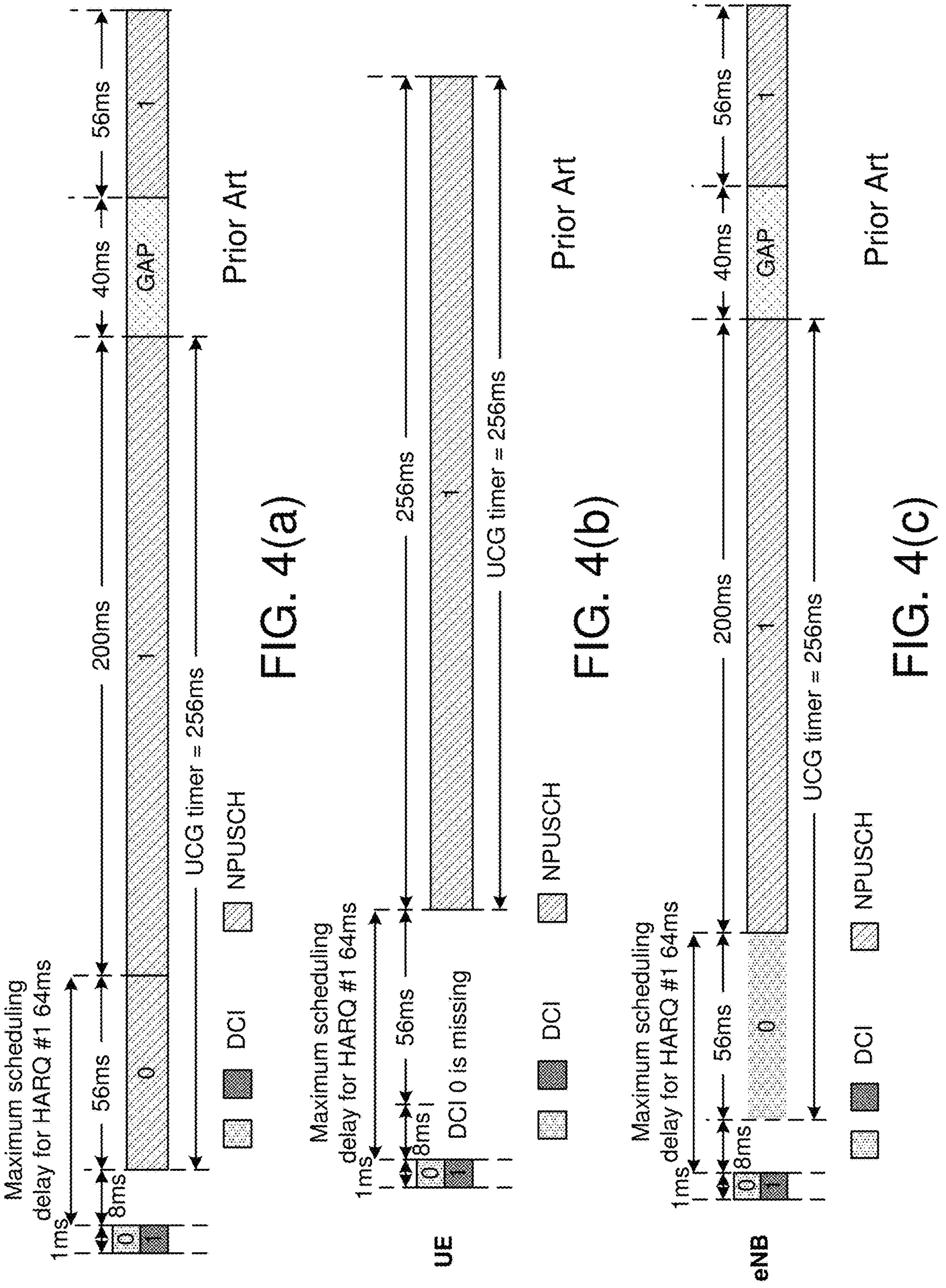
FIG. 4(a) Prior Art
FIG. 4(b) Prior Art
FIG. 4(c) Prior Art
FIG. 4(*a*) illustrates a normal uplink transmission including two scheduled NPUSCH transmissions.
Figure 5:
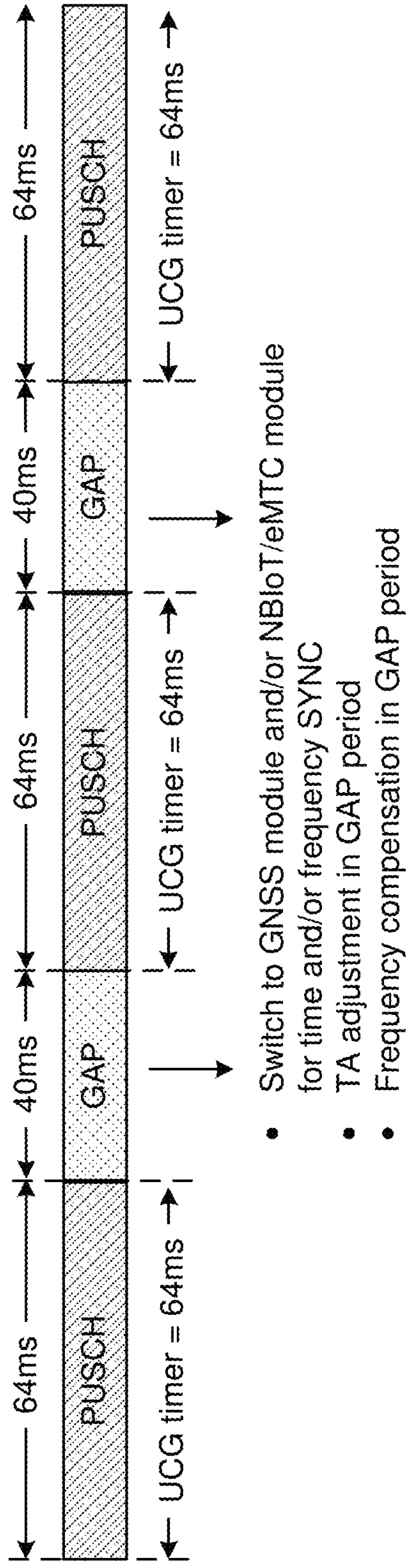
Prior Art FIG. 5
FIG. 5 illustrates an example of shorter UCO timer and longer length of transmission gap.

According to a third embodiment, the indication of $k_0$, which is 2 bits in NBIoT Release 13 (see FIG. 2(*a*) or 2(*b*)), is extended, for example, to 3 bits (i.e. 8 possible values) or 4 bits (i.e. 16 possible values). For example, the delay 1 ($k_0$) can be chosen from a set {8, 16, 32, 64, 128, . . . }. The values in the set may consider the length of the transmission gap and the possible number of transmission gaps. For example, if the length of the transmission gap is 40 ms, and the possible number of transmission gaps is 0 or 1 or 2, the set may be {8, 16, 32, 64, 104 (=64+40), 128, 168 (=128+40), 208 (=128+2*40)} if 3 bits are used for indication of $k_0$.

According to a fourth embodiment, an additional delay (i.e. delay 2 or $k_1$) is introduced to reflect the gap insertion before and/or during the uplink (NPUSCH) transmission. The uplink (NPUSCH) transmission can be NPUSCH format 1 transmission scheduled by DCI format N0, or NPUSCH format 2 transmission (i.e. feedback message) scheduled by DCI format N1, or Msg3 transmission (i.e. another kind of feedback message to RAR) scheduled by RAR in RACH procedure. The delay 2 can be contained in the DCI (DCI format N0 or DCI format N1) scheduling the NPUSCH transmission with 1 or 2 bits. The delay 2 can be in unit of the gap length ($T_{gap}$). For example, the delay 2 can be chosen from a set of {0, 1} or {0, 1, 2}.

Figure 9:
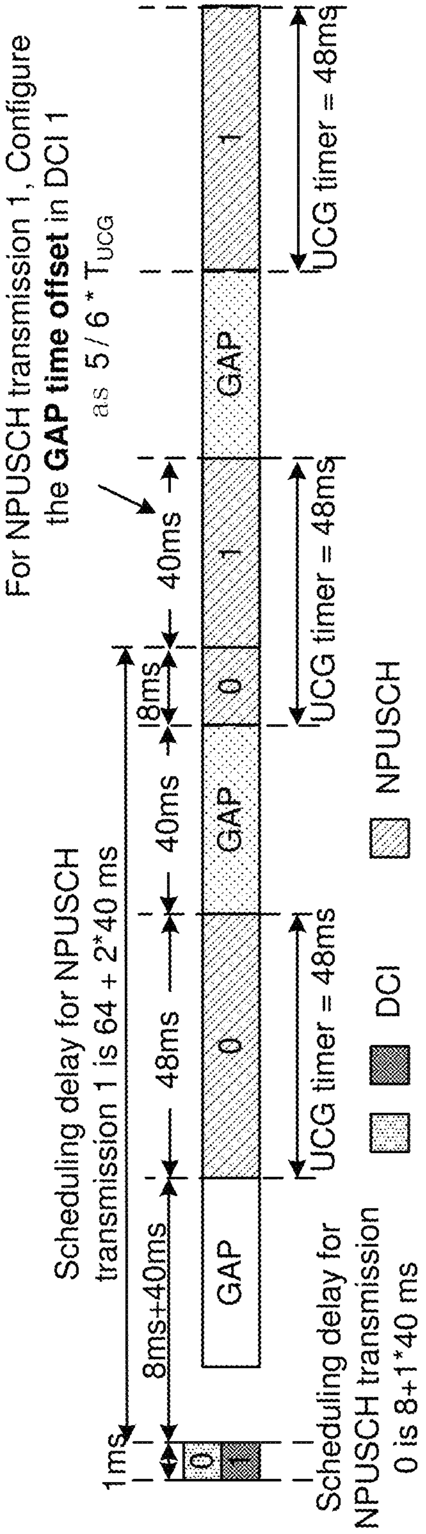
FIG. 9 illustrates an example of the fourth embodiment.

FIG. 9 illustrates an example of the fourth embodiment for NPUSCH format 1 transmission scheduled by DCI format N0. In the example of FIG. 9, UCG timer is set to 48 ms. For scheduled NPUSCH transmission 0, the scheduling delay (in addition to additional delay offset $K_{offset}$) is $k_0$=8 ms, and $k_1$=1, and the time length of NPUSCH transmission 0 is 56 ms; for scheduled NPUSCH transmission 1, the scheduling delay is $k_0$=64 ms (=8 (scheduling offset for NPUSCH transmission 0)+56 (time length of NPUSCH transmission 0) and $k_1$=2, and the time length of NPUSCH transmission 1 is 88 ms. As can be seen from FIG. 9, the scheduling delay of scheduled NPUSCH transmission 0 is $k_0+k_1*T_{gap}$=8+1*40=48 ms. The time length of NPUSCH transmission 0, that is 56 ms, is broken into two parts (a first part of 48 ms and a second part of 8 ms) to be transmitted due to the UCG timer being set to 48 ms. The scheduling delay of scheduled NPUSCH transmission 1 is $k_0+k_1*T_{gap}$=64+2*40=144 ms, which is equivalent to 48 ms (the scheduling delay of NPUSCH transmission 0)+56 ms (the length of NPUSCH transmission 0)+40 ms (the length of additional transmission gap for NPUSCH transmission 1). In FIG. 9, for NPUSCH transmission 1, the gap time offset in DCI may be configured as 5/6 (i.e. $T_{offset}$=5 $T_{UCG}$/6=40 ms). The time length of NPUSCH transmission 1, that is 88 ms, is broken into two parts (a first part of 40 ms and a second part of 48 ms) to be transmitted due to the UCG timer being set to 48 ms and the gap time offset for NPUSCH transmission 1 being set to 40 ms.

According to a fifth embodiment, the scheduling delay of an NPUSCH transmission (e.g. NPUSCH format 1 transmission scheduled by DCI format N0, or NPUSCH format 2 transmission (i.e. feedback message) scheduled by DCI format N1, or Msg3 transmission (i.e. another kind of feedback message to RAR) scheduled by RAR in RACH procedure) is determined by $\alpha T+\beta$, where $\alpha$ and $\beta$ are configured by the DCI scheduling the NPUSCH transmission, and T is determined by higher layer parameter or by parameters $N_{RU}$ and $N_{rep}$. $\alpha$ represents the length of the transmission gap and previous uplink transmission duration and is indicated by DCI, e.g. from a set of {0, ½, 1, 3/2} in unit of UCG timer ($T_{UCG}$). $\beta$ represents the scheduling flexibility and is indicated by DCI, e.g. from a set of {8,16}. T may be determined by $N_{slot}$*$N_{RU}$*$N_{rep}$.

According to a variation of the fifth embodiment, the scheduling delay of an NPUSCH transmission is determined by $\alpha T+\gamma T_{gap}+\beta$, where $\alpha$, $\gamma$ and $\beta$ are configured by the DCI scheduling the NPUSCH transmission. $\alpha$ represents the previous uplink transmission duration, $\gamma$ represents the number of transmission gaps, and $\beta$ represents the scheduling flexibility.

In all of the first to the fifth embodiments, the additional delay offset $K_{offset}$ is not discussed. Since the additional delay offset $K_{offset}$ is only related to the round trip distance between the UE and eNB in NTN, it has no direct connection with this disclosure. However, in actual implementation in NTN NBIoT, the additional delay offset $K_{offset}$ should also be added in the scheduling delay.

In all of the above embodiments, the scheduling delay may refer to the delay between the end of DCI format N0 and the start of the NPUSCH transmission scheduled by the DCI format N0, or the delay between the end of NPDSCH transmission scheduled by DCI Format N1 and the start of the transmission of the corresponding HARQ feedback (NPUSCH format 2) of the NPDSCH transmission, or the delay between the end of RAR transmission and the start of the Msg3 transmission.

Figure 10:
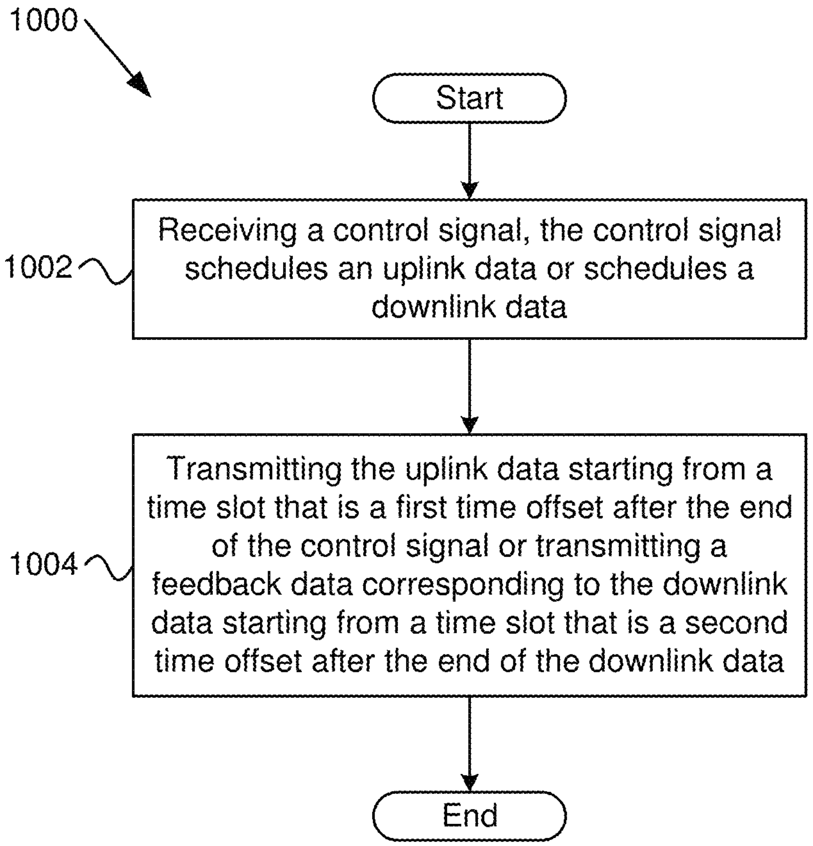
FIG. 10 is a schematic flow chart diagram illustrating an embodiment of a method.

FIG. 10 is a schematic flow chart diagram illustrating an embodiment of a method 1000 according to the present application. In some embodiments, the method 1000 is performed by an apparatus, such as a remote unit. In certain embodiments, the method 1000 may be performed by a processor executing program code, for example, a microcontroller, a microprocessor, a CPU, a GPU, an auxiliary processing unit, a FPGA, or the like.

The method 1000 may include 1002 receiving a control signal, the control signal schedules an uplink data or schedules a downlink data; and 1004 transmitting the uplink data starting from a time slot that is a first time offset after the end of the control signal or transmitting a feedback data corresponding to the downlink data starting from a time slot that is a second time offset after the end of the downlink data.

In the method 1000, the uplink data or the feedback data may be inserted with transmission gap(s), the transmission gap is defined by an uplink compensation gap duration ($T_{UCG}$) and a length ($T_{gap}$) of the transmission gap.

A first transmission gap starts from a gap time offset ($T_{offset}$) after the start of the uplink data or the feedback data. The gap time offset ($T_{offset}$) may be indicated in the control signal. In addition, the gap time offset ($T_{offset}$) may be in unit of the uplink compensation gap duration ($T_{UCG}$).

A start time slot of each transmission gap may meet a condition determined by the uplink compensation gap duration ($T_{UCG}$), the length ($T_{gap}$) of the transmission gap, and a gap time offset ($T_{offset}$). For example, the condition may be: (10*SFN+subframe) modulo ($T_{gap}$+$T_{UCG}$)=$T_{offset}$, where SFN and subframe are start SFN and start subframe of uplink data or feedback data transmission. The gap time offset ($T_{offset}$) may be configured by higher layer. The first time offset or the second time offset may exclude the length of the transmission gap. The uplink data or the feedback data is postponed to be transmitted from a time slot meeting the condition.

The first time offset or the second time offset may include a first number of the transmission gaps, wherein the first number is indicated in the control signal.

The first time offset or the second time offset may be determined by at least one of a first scaling factor ($\alpha$), a first time duration (T) and a second time duration ($\beta$). The first time duration (T) may be configured by higher layer or determined by at least one of a resource unit number ($N_{RU}$), a repetition number ($N_{Rep}$) and a slot time duration ($N_{slot}$) of the uplink data or the feedback data. The first scaling factor ($\alpha$) and/or the second time duration ($\beta$) may be indicated in the control signal.

Figure 11:
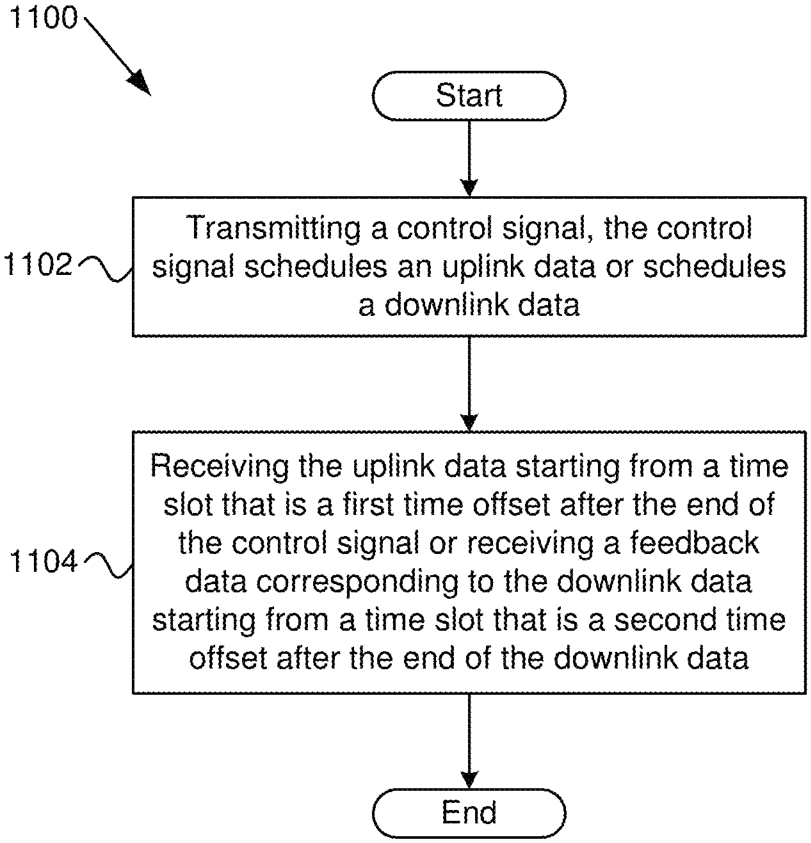
FIG. 11 is a schematic flow chart diagram illustrating another embodiment of a method.

FIG. 11 is a schematic flow chart diagram illustrating a further embodiment of a method 1100 according to the present application. In some embodiments, the method 1100 is performed by an apparatus, such as a base unit. In certain embodiments, the method 1100 may be performed by a processor executing program code, for example, a microcontroller, a microprocessor, a CPU, a GPU, an auxiliary processing unit, a FPGA, or the like.

The method 1100 may include 1102 transmitting a control signal, the control signal schedules an uplink data or schedules a downlink data; and 1104 receiving the uplink data starting from a time slot that is a first time offset after the end of the control signal or receiving a feedback data corresponding to the downlink data starting from a time slot that is a second time offset after the end of the downlink data.

In the method 1100, the uplink data or the feedback data may be inserted with transmission gap(s), the transmission gap is defined by an uplink compensation gap duration ($T_{UCG}$) and a length ($T_{gap}$) of the transmission gap.

A first transmission gap starts from a gap time offset ($T_{offset}$) after the start of the uplink data or the feedback data. The gap time offset ($T_{offset}$) may be indicated in the control signal. In addition, the gap time offset ($T_{offset}$) may be in unit of the uplink compensation gap duration ($T_{UCG}$).

A start time slot of each transmission gap may meet a condition determined by the uplink compensation gap duration ($T_{UCG}$), the length ($T_{gap}$) of the transmission gap, and a gap time offset ($T_{offset}$). For example, the condition may be: (10*SFN+subframe) modulo ($T_{gap}$+$T_{UCG}$)=$T_{offset}$, where SFN and subframe are start SFN and start subframe of uplink data or feedback data transmission. The gap time offset ($T_{offset}$) may be configured by higher layer. The first time offset or the second time offset may exclude the length of the transmission gap. The uplink data or the feedback data is postponed to be received from a time slot meeting the condition.

The first time offset or the second time offset may include a first number of the transmission gaps, wherein the first number is indicated in the control signal.

The first time offset or the second time offset may be determined by at least one of a first scaling factor ($\alpha$), a first time duration (T) and a second time duration (β). The first time duration (T) may be configured by higher layer or determined by at least one of a resource unit number ($N_{RU}$), a repetition number ($N_{Rep}$) and a slot time duration ($N_{slot}$) of the uplink data or the feedback data. The first scaling factor (α) and/or the second time duration (β) may be indicated in the control signal.

Figure 12:
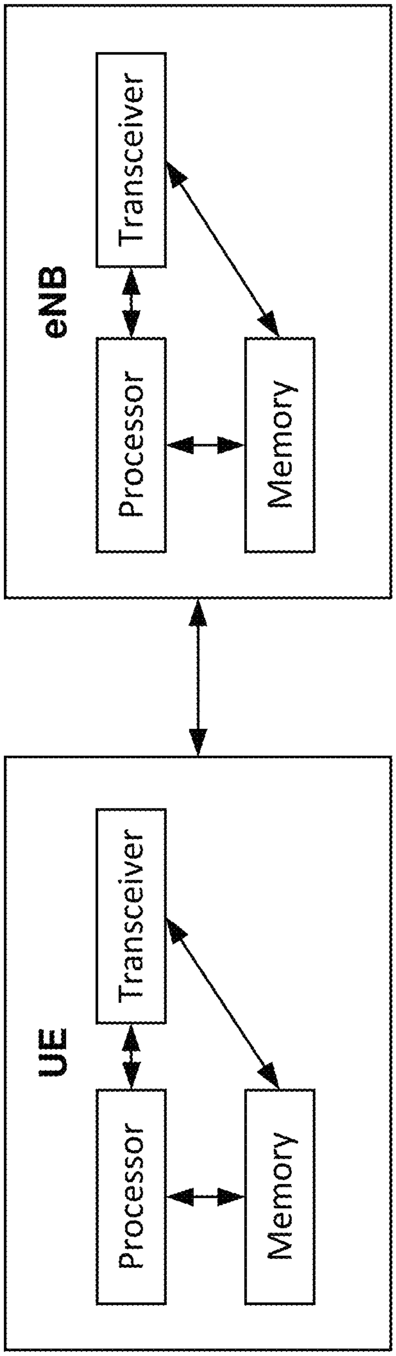
FIG. 12 is a schematic block diagram illustrating apparatuses according to one embodiment.

FIG. 12 is a schematic block diagram illustrating apparatuses according to one embodiment.

Referring to FIG. 12, the UE (i.e. the remote unit) includes a processor, a memory, and a transceiver. The processor implements a function, a process, and/or a method which are proposed in FIG. 10.

The remote unit may include a receiver that receives a control signal, the control signal schedules an uplink data or schedules a downlink data, and a transmitter that transmits the uplink data starting from a time slot that is a first time offset after the end of the control signal or transmits a feedback data corresponding to the downlink data starting from a time slot that is a second time offset after the end of the downlink data.

The uplink data or the feedback data may be inserted with transmission gap(s), the transmission gap is defined by an uplink compensation gap duration ($T_{UCG}$) and a length ($T_{gap}$) of the transmission gap.

A first transmission gap starts from a gap time offset ($T_{offset}$) after the start of the uplink data or the feedback data. The gap time offset ($T_{offset}$) may be indicated in the control signal. In addition, the gap time offset ($T_{offset}$) may be in unit of the uplink compensation gap duration ($T_{UCG}$).

A start time slot of each transmission gap may meet a condition determined by the uplink compensation gap duration ($T_{UCG}$), the length ($T_{gap}$) of the transmission gap, and a gap time offset ($T_{offset}$). For example, the condition may be: (10*SFN+subframe) modulo ($T_{gap}$+$T_{UCG}$)=$T_{offset}$, where SFN and subframe are start SFN and start subframe of uplink data or feedback data transmission. The gap time offset ($T_{offset}$) may be configured by higher layer. The first time offset or the second time offset may exclude the length of the transmission gap. The uplink data or the feedback data is postponed to be transmitted from a time slot meeting the condition.

The first time offset or the second time offset may include a first number of the transmission gaps, wherein the first number is indicated in the control signal.

The first time offset or the second time offset may be determined by at least one of a first scaling factor (α), a first time duration (T) and a second time duration (β). The first time duration (T) may be configured by higher layer or determined by at least one of a resource unit number ($N_{RU}$), a repetition number ($N_{Rep}$) and a slot time duration ($N_{slot}$) of the uplink data or the feedback data. The first scaling factor (α) and/or the second time duration (β) may be indicated in the control signal.

The eNB (i.e. base unit) includes a processor, a memory, and a transceiver. The processors implement a function, a process, and/or a method which are proposed in FIG. 11.

The base unit may include a transmitter that transmits a control signal, the control signal schedules an uplink data or schedules a downlink data, and a receiver that receives the uplink data starting from a time slot that is a first time offset after the end of the control signal or receives a feedback data corresponding to the downlink data starting from a time slot that is a second time offset after the end of the downlink data.

The uplink data or the feedback data may be inserted with transmission gap(s), the transmission gap is defined by an uplink compensation gap duration ($T_{UCG}$) and a length ($T_{gap}$) of the transmission gap.

A first transmission gap starts from a gap time offset ($T_{offset}$) after the start of the uplink data or the feedback data. The gap time offset ($T_{offset}$) may be indicated in the control signal. In addition, the gap time offset ($T_{offset}$) may be in unit of the uplink compensation gap duration ($T_{UCG}$).

A start time slot of each transmission gap may meet a condition determined by the uplink compensation gap duration ($T_{UCG}$), the length ($T_{gap}$) of the transmission gap, and a gap time offset ($T_{offset}$). For example, the condition may be: (10*SFN+subframe) modulo ($T_{gap}$+$T_{UCG}$)=$T_{offset}$, where SFN and subframe are start SFN and start subframe of uplink data or feedback data transmission. The gap time offset ($T_{offset}$) may be configured by higher layer. The first time offset or the second time offset may exclude the length of the transmission gap. The uplink data or the feedback data is postponed to be received from a time slot meeting the condition.

The first time offset or the second time offset may include a first number of the transmission gaps, wherein the first number is indicated in the control signal.

The first time offset or the second time offset may be determined by at least one of a first scaling factor (α), a first time duration (T) and a second time duration (β). The first time duration (T) may be configured by higher layer or determined by at least one of a resource unit number ($N_{RU}$), a repetition number ($N_{Rep}$) and a slot time duration ($N_{slot}$) of the uplink data or the feedback data. The first scaling factor (α) and/or the second time duration (β) may be indicated in the control signal.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
receiving a control signal, the control signal schedules an uplink data or a downlink data; and
one of:
inserting a transmission gap ($T_{gap}$), during transmission of the uplink data, at a time corresponding to a gap time offset ($T_{offset}$) after a start of the transmission of the uplink data; and
inserting a transmission gap ($T_{gap}$), during transmission of a feedback data corresponding to the downlink data, at a time corresponding to the gap time offset ($T_{offset}$) after a start of the transmission of the feedback data,
wherein the control signal comprises a code corresponding to the $T_{offset}$, wherein the code is used to calculate $T_{offset}$, wherein each code corresponds to a different specified amount of time for $T_{offset}$ calculated using the code and an uplink compensation gap duration ($T_{UCG}$).

2. The method of claim 1, wherein transmission of the uplink data or the feedback data occur within the uplink compensation gap duration ($T_{UCG}$) and wherein transmission of the uplink data or the feedback data is inserted with one or more subsequent transmission gaps ($T_{gaps}$) after a duration of each uplink compensation gap duration ($T_{UCG}$).

3. The method of claim 2, wherein, a first transmission gap ($T_{gap}$) starts from a gap time offset ($T_{offset}$) after the start of the uplink data or the feedback data.

4. The method of claim 3, wherein, the gap time offset ($T_{offset}$) is indicated in the control signal.

5. The method of claim 3, wherein, the gap time offset ($T_{offset}$) is in units of the uplink compensation gap duration ($T_{UCG}$).

6. The method of claim 1, wherein, the gap time offset ($T_{offset}$) is configured by higher layer.

7. The method of claim 1, wherein, the gap time offset excludes the length of the transmission gap ($T_{gap}$).

8. The method of claim 1, wherein the gap time offset is determined by at least one of a first scaling factor (α), a first time duration (T) and a second time duration (β).

9. The method of claim 8, wherein, the first time duration (T) is configured by higher layer or determined by at least one of a resource unit number ($N_{RU}$), a repetition number ($N_{Rep}$) and a slot time duration ($N_{slot}$) of the uplink data or the feedback data.

10. The method of claim 1, wherein at least a portion of possible codes each correlate to a fraction to be multiplied by an uplink compensation gap duration ($T_{UCG}$) to derive the $T_{offset}$.

11. The method of claim 1, wherein the code comprising 0 or 1 corresponds to a $T_{offset}$ of zero before a first transmission gap ($T_{gap}$), and the code comprising an integer other than the 0 or 1 correlates to a fraction to be multiplied by an uplink compensation gap duration ($T_{UCG}$) to derive a $T_{offset}$.

12. A user equipment (UE), comprising:
at least one memory; and
at least one processor coupled with the at least one memory and configured to cause the UE to:
receive a control signal, the control signal schedules an uplink data or a downlink data; and
one of:
insert a transmission gap ($T_{gap}$), during transmission of the uplink data, at a time corresponding to a gap time offset ($T_{offset}$) after a start of the transmission of the uplink data;
and
insert a transmission gap ($T_{gap}$), during transmission of a feedback data corresponding to the downlink data, at a time corresponding to the gap time offset ($T_{offset}$) after a start of the transmission of the feedback data,
wherein the control signal comprises a code corresponding to the $T_{offset}$, wherein the code is used to calculate $T_{offset}$, wherein each code corresponds to a different specified amount of time for $T_{offset}$ calculated using the code and an uplink compensation gap duration ($T_{UCG}$).

13. A base station, comprising:
at least one memory; and
at least one processor coupled with the at least one memory and configured to cause the base station to:
transmit a control signal, the control signal schedules an uplink data or a downlink data; and
one of:
receive the uplink data, wherein a transmission gap ($T_{gap}$) is inserted, at a time corresponding to a gap time offset ($T_{offset}$) after a start of the transmission of the uplink data;
and
receives a feedback data corresponding to the downlink data wherein a transmission gap ($T_{gap}$) is inserted, at a time corresponding to a gap time offset ($T_{offset}$) after a start of the transmission of the feedback data,
wherein the control signal comprises a code corresponding to the $T_{offset}$, wherein the code is used to calculate $T_{offset}$, wherein each code corresponds to a different specified amount of time for $T_{offset}$ calculated using the code and an uplink compensation gap duration ($T_{UCG}$).

14. A processor for wireless communication, comprising:
at least one controller coupled with at least one memory and configured to cause the processor to:
receive a control signal, the control signal schedules an uplink data or a downlink data; and
one of:
inserts a transmission gap ($T_{gap}$), during transmission of the uplink data, at a time corresponding to a gap time offset ($T_{offset}$) after a start of the transmission of the uplink data;
and
inserts a transmission gap ($T_{gap}$), during transmission of a feedback data corresponding to the downlink data, at a time corresponding to the gap time offset ($T_{offset}$) after a start of the transmission of the feedback data,
wherein the control signal comprises a code corresponding to the $T_{offset}$, wherein the code is used to calculate $T_{offset}$, wherein each code corresponds to a different specified amount of time for $T_{offset}$ calculated using the code and an uplink compensation gap duration ($T_{UCG}$).

15. The processor of claim 14, wherein transmission of the uplink data or the feedback data occur within an uplink compensation gap duration ($T_{UCG}$) and wherein transmission of the uplink data or the feedback data is inserted with one or more subsequent transmission gaps ($T_{gaps}$) after a duration of each uplink compensation gap duration ($T_{UCG}$).

16. The processor of claim 15, wherein, a first transmission gap ($T_{gap}$) starts from a gap time offset ($T_{offset}$) after the start of the uplink data or the feedback data.

17. The processor of claim 16, wherein, the gap time offset ($T_{offset}$) is indicated in the control signal.

18. The processor of claim 16, wherein, the gap time offset ($T_{offset}$) is in units of the uplink compensation gap duration ($T_{UCG}$).

19. The processor of claim 15, wherein, a start time slot of each transmission gap ($T_{gap}$) meets a condition determined by the uplink compensation gap duration ($T_{UCG}$), the length ($T_{gap}$) of the transmission gap ($T_{gap}$), and a gap time offset ($T_{offset}$).

* * * * *